(12) United States Patent
Ni et al.

(10) Patent No.: US 11,711,992 B2
(45) Date of Patent: Aug. 1, 2023

(54) SELF-PROPELLED PLATFORM FOR MONITORING FIELD CROP PHENOTYPE

(71) Applicants: Nanjing Agricultural University, Jiangsu Province (CN); Shennong Smart Agriculture Research Institute Nanjing Co., Ltd., Nanjing (CN)

(72) Inventors: Jun Ni, Jiangsu Province (CN); Huali Yuan, Jiangsu Province (CN); Weixing Cao, Jiangsu Province (CN); Yan Zhu, Jiangsu Province (CN); Xiaoping Jiang, Jiangsu Province (CN); Lili Yao, Jiangsu Province (CN); Fangrong Pang, Jiangsu Province (CN); Donghang Li, Jiangsu Province (CN)

(73) Assignees: Nanjing Agricultural University, Jiangsu Province (CN); Shennong Smart Agriculture Research Institute Nanjing Co., Ltd., Nanjing (CN)

( * ) Notice: Subject to any disclaimer, the term of this patent is extended or adjusted under 35 U.S.C. 154(b) by 43 days.

(21) Appl. No.: 17/669,210

(22) Filed: Feb. 10, 2022

(65) Prior Publication Data
US 2022/0256761 A1 Aug. 18, 2022

(30) Foreign Application Priority Data
Feb. 18, 2021 (CN) .......................... 202110187488.3

(51) Int. Cl.
*A01B 51/02* (2006.01)
*B60K 7/00* (2006.01)
(Continued)

(52) U.S. Cl.
CPC .......... *A01B 51/023* (2013.01); *B60K 7/0007* (2013.01); *B62D 5/0418* (2013.01);
(Continued)

(58) Field of Classification Search
CPC ................ A01B 51/023; B60K 7/0007; B60K 2007/0038; B60K 2007/0084; B62D 5/0418; B62D 21/14
See application file for complete search history.

(56) References Cited

U.S. PATENT DOCUMENTS 7,837,207 B2 * 11/2010 Kremmin ................. B60G 3/01
280/5.514
8,042,817 B2 * 10/2011 Motebennur ...... B62D 49/0678
280/6.154
(Continued)

*Primary Examiner* — Erez Gurari
(74) *Attorney, Agent, or Firm* — Procopio, Cory, Hargreaves & Savitch LLP

(57) ABSTRACT

A self-propelled platform for monitoring field crop phenotype is provided. The monitoring platform includes a traveling and steering mechanism, wheel track and ground clearance adjustment devices, damping devices, and a case. The traveling and steering mechanism includes wheel side motors, wheels, and torque motors. The wheels are connected to respective upright posts of the platform through respective rigid independent suspensions. Each upright post is of sleeve structure and includes an upper sleeve and a lower sleeve. A corresponding damping device is connected between the upper sleeve and the lower sleeve. The wheel track and ground clearance adjustment devices are configured for adjusting the height of the case and the tracks between the wheels. The lower ends of the wheel track and ground clearance adjustment devices are rotatably connected to respective upright posts, and the upper ends are rotatably connected to the case.

13 Claims, 5 Drawing Sheets

(51) Int. Cl.
  *B62D 5/04*  (2006.01)
  *B62D 21/14* (2006.01)
(52) U.S. Cl.
  CPC ...... *B62D 21/14* (2013.01); *B60K 2007/0038* (2013.01); *B60K 2007/0084* (2013.01)

(56) References Cited

U.S. PATENT DOCUMENTS

| | | | | |
|---|---|---|---|---|
| 8,205,893 | B2* | 6/2012 | Peterson | B62D 49/0607 |
| | | | | 280/6.157 |
| 9,108,556 | B2* | 8/2015 | Terry | B60P 1/00 |
| 9,737,066 | B2* | 8/2017 | Jones | A01C 23/008 |
| 10,279,643 | B2* | 5/2019 | Fay, II | B60G 17/0152 |
| 10,517,285 | B2* | 12/2019 | Crowley | B60G 3/01 |
| 2007/0152427 | A1* | 7/2007 | Olsen | B60L 15/20 |
| | | | | 280/649 |
| 2011/0024219 | A1* | 2/2011 | Jorgensen | B62D 5/0418 |
| | | | | 475/336 |
| 2014/0309902 | A1* | 10/2014 | Katsuyama | B60W 10/22 |
| | | | | 701/70 |
| 2015/0102570 | A1* | 4/2015 | Slawson | B60G 3/01 |
| | | | | 280/6.157 |
| 2017/0066323 | A1* | 3/2017 | Goren | B60K 7/0007 |
| 2017/0355243 | A1* | 12/2017 | Albert | B60G 7/006 |
| 2019/0031221 | A1* | 1/2019 | Atsumi | B66C 19/005 |
| 2019/0200510 | A1* | 7/2019 | Chrysanthakopoulos | |
| | | | | B60K 17/28 |
| 2019/0248233 | A1* | 8/2019 | Calleija | B60B 37/10 |
| 2019/0263215 | A1* | 8/2019 | Shibuya | B60K 7/0007 |
| 2019/0302775 | A1* | 10/2019 | Palan | G06V 20/58 |
| 2020/0023916 | A1* | 1/2020 | Mackarvich | F41H 7/044 |
| 2020/0114714 | A1* | 4/2020 | Doan | B62D 61/10 |
| 2020/0216127 | A1* | 7/2020 | Suh | B62D 57/028 |
| 2022/0096292 | A1* | 3/2022 | Woo | B60K 1/04 |
| 2022/0176765 | A1* | 6/2022 | Gao | B60G 3/20 |
| 2022/0256761 | A1* | 8/2022 | Ni | B62D 49/0678 |
| 2023/0000003 | A1* | 1/2023 | Chrysanthakopoulos | |
| | | | | G05D 1/0214 |

* cited by examiner

SELF-PROPELLED PLATFORM FOR MONITORING FIELD CROP PHENOTYPE

CROSS REFERENCE TO RELATED APPLICATION

This application claims the priority of Chinese Patent Application No. 202110187488.3, entitled "Self-propelled Platform for Monitoring Field Crop Phenotype" filed with the Chinese National Intellectual Property Administration on Feb. 18, 2021, which is incorporated herein by reference in its entirety.

TECHNICAL FIELD

The present disclosure relates to the field of crop phenotype monitoring, and in particular, to a self-propelled platform for monitoring field crop phenotype.

BACKGROUND ART

Phenotype is an important bridge for researching genes and environments. A self-propelled platform for monitoring crop phenotype is an important tool for monitoring field crop phenotypes. At present, there are few self-propelled platforms specifically for monitoring field crop phenotype. In addition, the existing self-propelled platform for monitoring field crop phenotype has the problems that a wheel track and a ground clearance are difficult to adjust automatically and vehicle body deformation is caused due to excessive resistance between wheels and a pavement during adjustment.

SUMMARY

An objective of the present embodiment is to provide a self-propelled platform for monitoring field crop phenotype to overcome the disadvantages in the prior art. The self-propelled platform for monitoring field crop phenotype can automatically adjust the wheel track and the ground clearance and realize automatic crossing and steering in a field.

To achieve the above objective, the present disclosure adopts a technical solution as follows:

A self-propelled platform for monitoring field crop phenotype includes a traveling and steering mechanism, wheel track and ground clearance adjustment devices, damping devices, and a case, wherein the traveling and steering mechanism comprises a plurality of wheel-side motors, a plurality of wheels, and a plurality of torque motors; the wheels are driven to travel through respective wheel-side motors and are driven to steer through respective torque motors; the wheels are respectively connected to respective upright posts of the self-propelled platform through respective suspensions being rigid independent; each upright post is of sleeve structures, and comprises an upper sleeve and a lower sleeve, between which a corresponding one of the damping devices is connected; the wheel track and ground clearance adjustment devices are configured for adjusting a height of the case and tracks between the wheels; and lower ends of the wheel track and ground clearance adjustment devices are rotatably connected to respective upright posts, and upper ends of the wheel track and ground clearance adjustment devices are rotatably connected to the case.

In some embodiments, output shafts of the wheel-side motors may be connected to respective speed reducers; output shafts of the speed reducers may be coaxial with rotating shafts of respective wheels; the wheel-side motors may rotate forward or reversely to drive respective wheels to rotate forward or reversely, so as to drive the self-propelled platform to move forward or backward.

In some embodiments, the number of the wheel-side motors, the number of the speed reducers, the number of the wheels and the number of the torque motors may be four; the wheel-side motors 7 and the speed reducers 8 may be located on inner sides of respective wheels and the wheel-side motors may be located above respective speed reducers; and the wheel-side motors may transfer power to the rotating shafts of respective wheels through respective speed reducers.

In some embodiments, each upright post may include the upper sleeve and the lower sleeve; the upper sleeve may be connected to the lower sleeve through a spring damping device for reducing an impact of pavement vibration on the self-propelled platform; the upper sleeve may be connected to a corresponding one of the wheel track and ground clearance adjustment devices through a corresponding one of first revolute joints; a corresponding one of the torque motors may be built in the lower sleeve; a base of the corresponding torque motor may be fixedly connected to a bottom end of the lower sleeve; an output shaft of the corresponding torque motor and a corresponding one of the suspensions may be connected by a spline and are limited by a clamp spring; and the corresponding torque motor may rotate to drive a corresponding one of the wheels to rotate to realize steering.

In some embodiments, each wheel track and ground clearance adjustment devices may be of double-rocker arm structure; the double-rocker arm structure may include an upper rocker arm and a lower rocker arm; the upper rocker arm may be of trapezoidal structure; and the lower rocker arm may be of triangular structure.

In some embodiments, two ends of each of the upper rocker arm and the lower rocker arm may be respectively connected to the case and an upper part of a corresponding upright post through respective third revolute joints; and rotation axes of the upper rocker arm and the lower rocker arm may be all parallel.

In some embodiments, lifting lugs may be welded at a top of each lower rocker arm and side surfaces of the case; two ends of each electric hydraulic rod may be respectively connected to a lifting lug at a top of a corresponding lower rocker arm and a lifting lug at a corresponding side surface of the case through fourth revolute joints; gaps at joints of the lifting lugs and the electric hydraulic rods may be filled with rubber gaskets; and an adjustment of the wheel track and the ground clearance may be realized through extending and retracting of the electric hydraulic rods.

In some embodiments, the self-propelled platform may stride in such a way that: one of four electric hydraulic rods is shortened, and other three electric hydraulic rods are locked; the shortened hydraulic rod drives the double-rocker arm structure to rotate and get close to the case, so as to drive a corresponding upright post, a corresponding suspension, and a corresponding wheel to move upwards; the wheel is lifted away from the ground, then, the torque motor rotates the corresponding wheel by 90 degrees, and the shortened hydraulic rod extends to an original position, so that the corresponding wheel is in contact with the ground; finally, by a same method, other three wheels are lifted away from the ground in sequence by respective hydraulic rods, and are placed on the ground after being adjusted by 90 degrees in a same direction; after four wheels all are rotated by 90 degrees, the four wheels are driven to move in a same direction through the wheel-side motors, so as to perform transverse striding movement; and after the self-propelled platform strides to a required position, the electric hydraulic rods are shortened in sequence such that double-rocker arm structures drive wheels to leave the ground, then the torque motors drive respective wheels to rotate back to the original positions (rotate −90 degrees), and the electric hydraulic rods extend, and the wheels land, so that a striding action is completed.

In some embodiments, a wheel track of the self-propelled platform may be adjusted in such a way that: four electric hydraulic rods are shortened in sequence, such that the double-rocker arm structures are converged in sequence to lift respective wheels away from the ground, the wheels are steered by 90 degrees by respective torque motors, and then the hydraulic rods extend to original lengths, so that the wheels land; after the wheels all complete abovementioned action, the electric hydraulic rods are adjusted to extend and retract according to a required wheel track, so that the double-rocker arm structures drive respective wheels on two sides of the case to roll in opposite directions to adjust the wheel track; and after the wheel track is adjusted, the wheels are lifted away from the ground, are recovered to the original positions (rotate−90 degrees), and land. The adjustment of the wheel track can avoid the deformation of a vehicle body caused by excessive resistance between the wheels and soil.

In some embodiments, a battery may be mounted inside the case, and an upper part of the case may be configured for carrying a monitoring device. During adjusting the wheel track, the case rotates relative to the double-rocker arms, so the ground clearance of the case, i.e., the ground clearance of the platform, changes along therewith. During the overall wheel track adjusting process, the case is capable of being adjusted to two position, that is a first position where the case is higher than the upright posts and the self-propelled platform exhibits a convex-shaped structure, and an included angle between the double-rocker arm and the upright post is an obtuse angle; and a second position where the case is lower than top ends of the upright posts and the self-propelled platform exhibits an M-shaped structure, and an included angle between the double-rocker arm and the upright post is an acute angle.

The present embodiment has the beneficial effects that: the self-propelled platform for monitoring field crop phenotype realizes that there are two states of the ground clearance for selecting under the same wheel track, which not only ensures the field trafficability of the self-propelled platform and avoids the damage to the crops, but also can meet different monitoring height.

Additional aspects and advantages of the present disclosure will be set forth in part in the following description. Some will become apparent from the following description, or will be understood by the practice of the present disclosure.

REFERENCE SIGNS IN THE DRAWINGS

1 wheel, 2 suspension, 3 upright post, 31 upright post upper sleeve, 32 upright post lower sleeve, 4 damping device, 5 wheel track and ground clearance adjustment device, 51 upper rocker arm, 52 lower rocker arm, 6 case, 7 wheel-side motor, 8 speed reducer, 9 torque motor, and 10 electric hydraulic rod.

DETAILED DESCRIPTION OF THE EMBODIMENTS

The present disclosure will be described in detail below in combination with drawings and specific embodiments.

Figure 1:
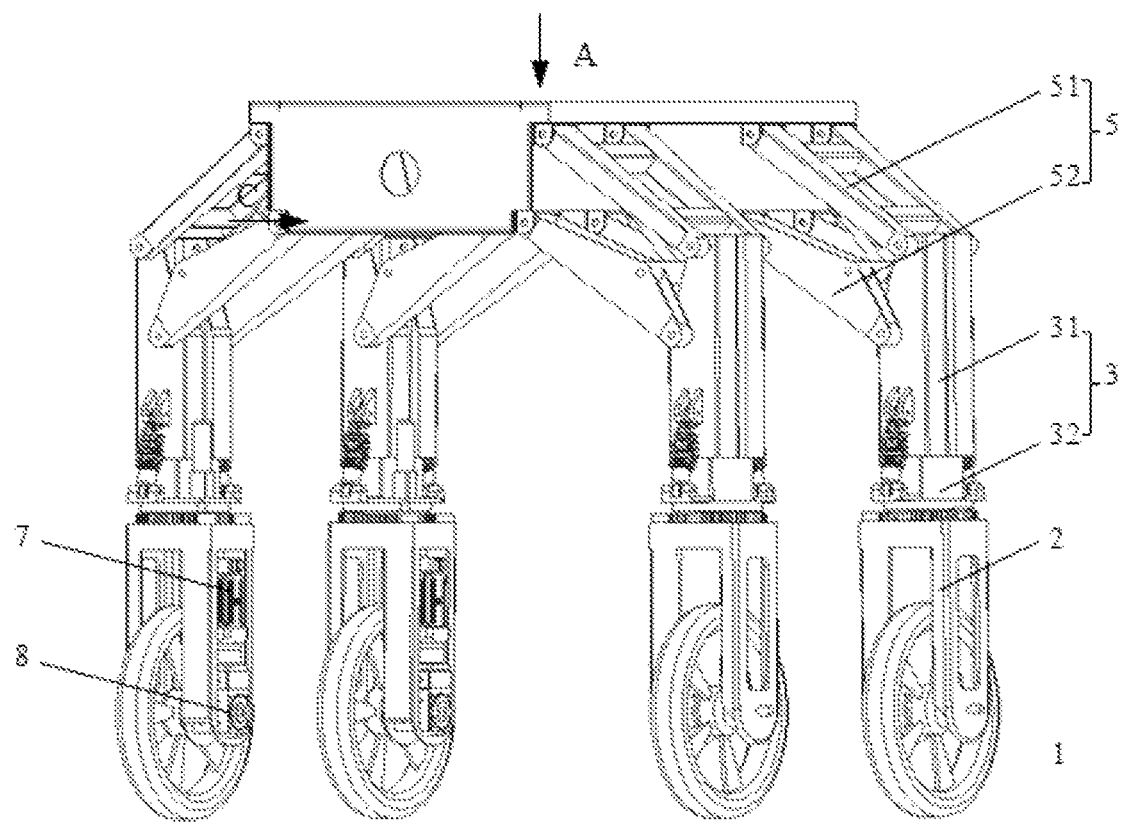
FIG. 1 is a schematic structural diagram of a self-propelled platform for monitoring field crop phenotype ("convex"-shaped).
Figure 2:
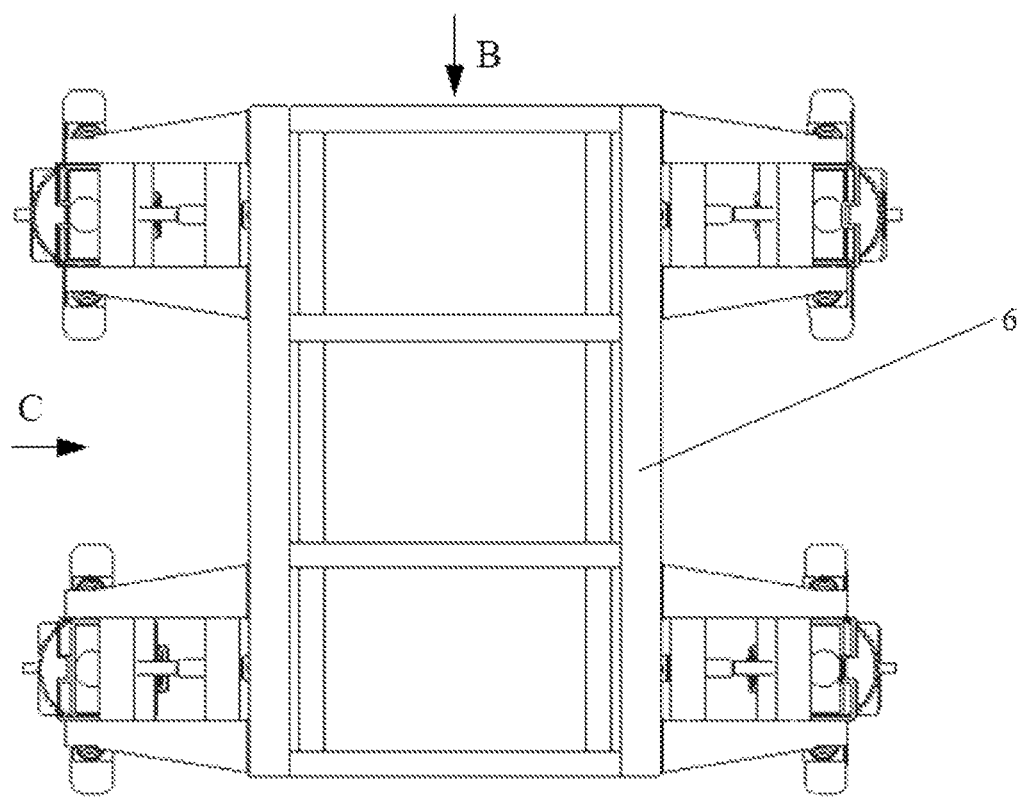
FIG. 2 is a view of the self-propelled platform as seen in a direction indicated by A in FIG. 1.
Figure 3:
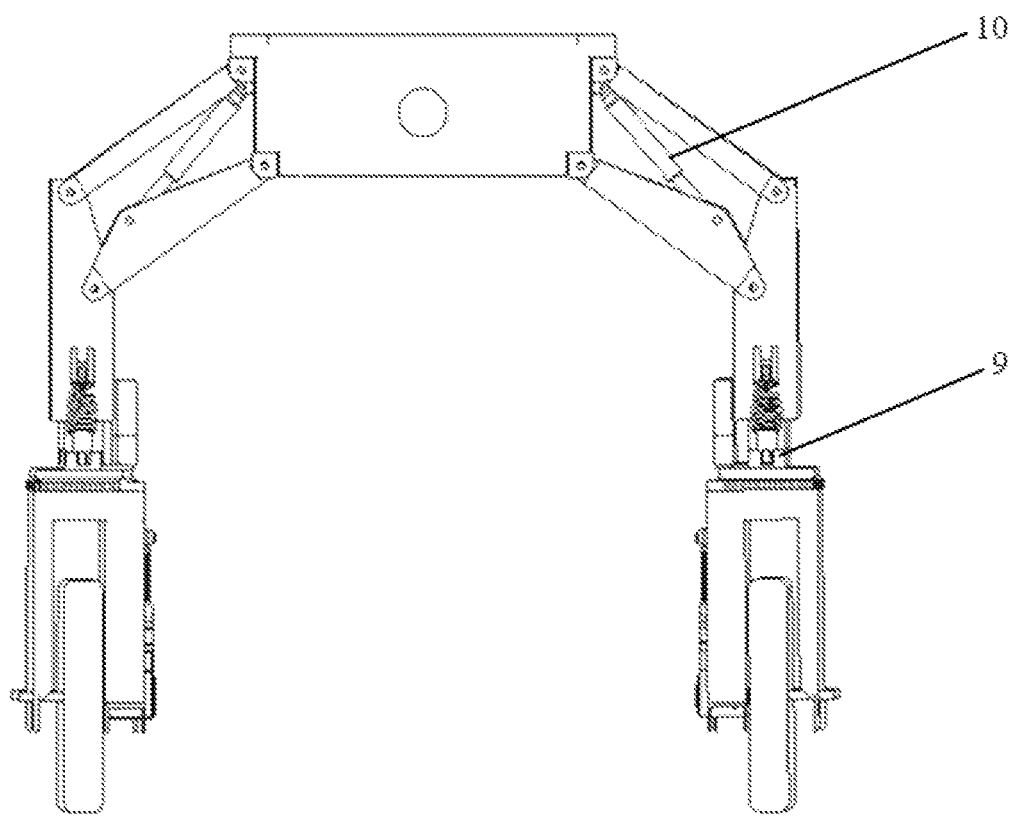
FIG. 3 is a view of the self-propelled platform as seen in a direction indicated by B in FIG. 2.
Figure 4:
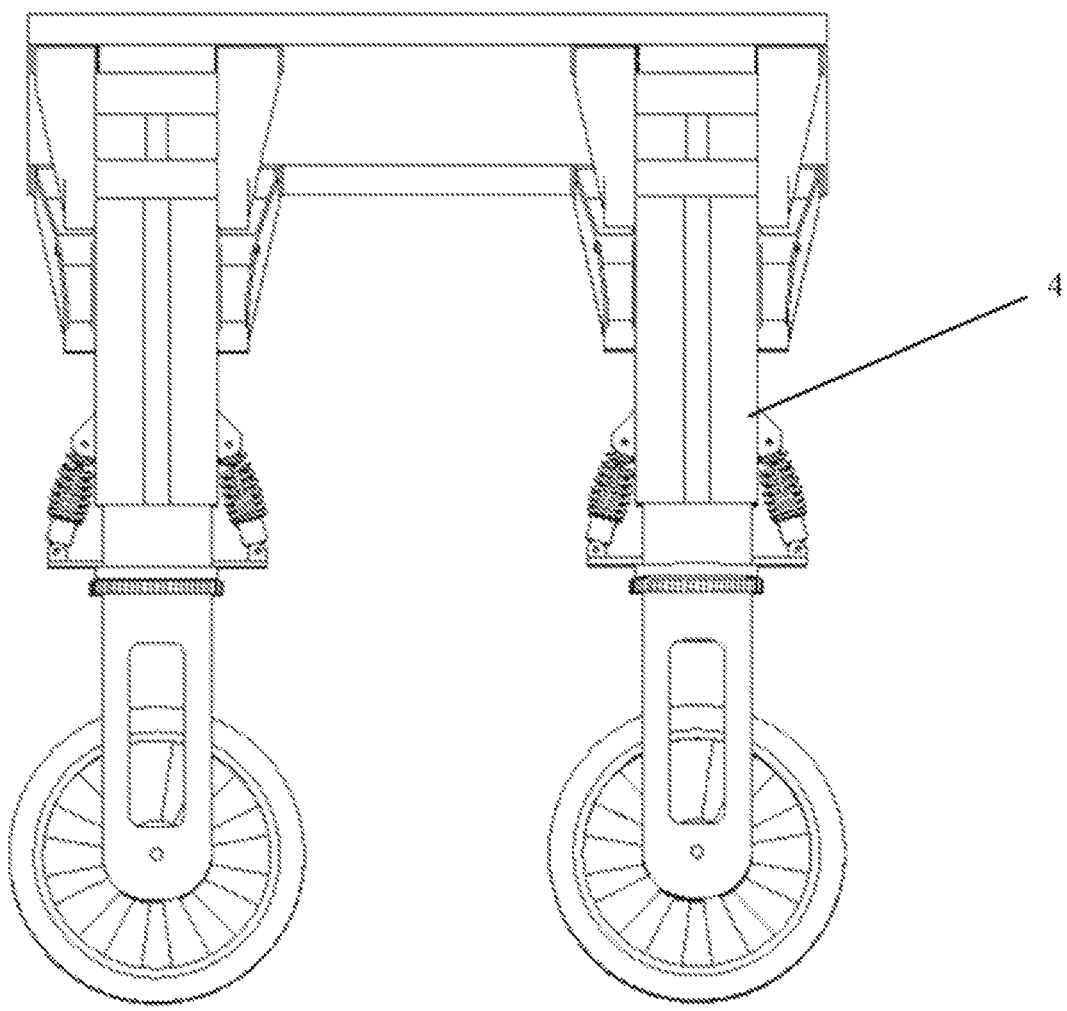
FIG. 4 is a view of the self-propelled platform as seen in a direction indicated by C in FIG. 2.
Figure 5:
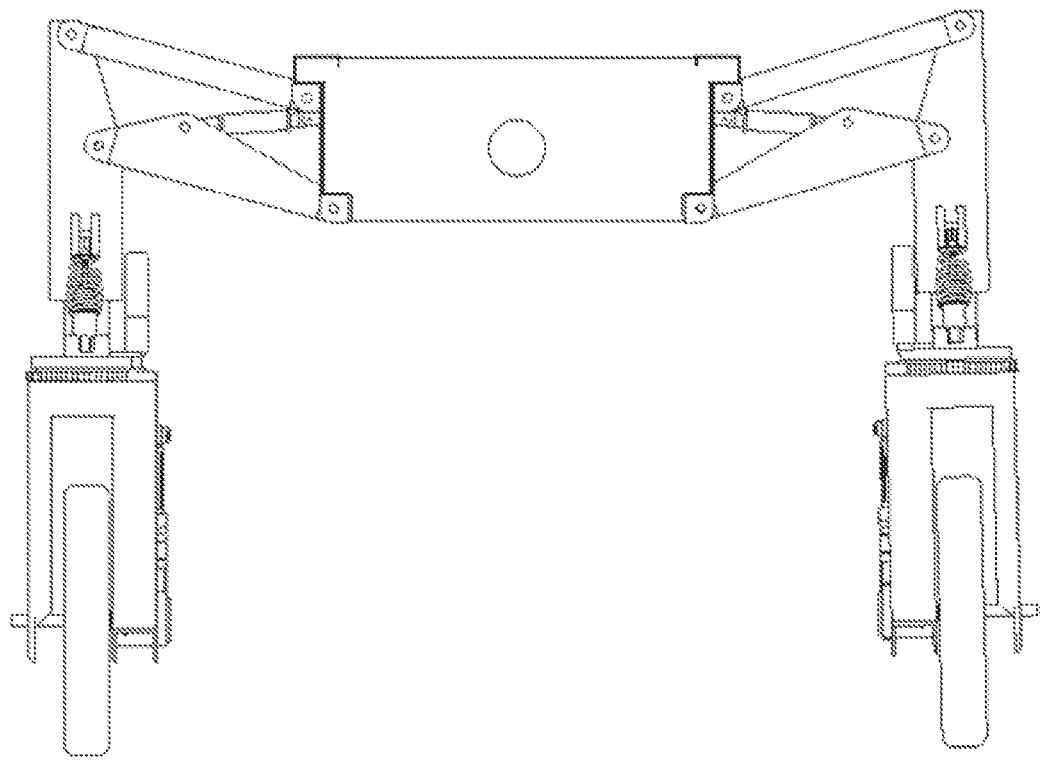
FIG. 5 is a schematic structural diagram of a self-propelled platform for monitoring field crop phenotype ("M"-shaped).

As shown in FIG. 1 to FIG. 5, a self-propelled platform for monitoring field crop phenotype includes a traveling mechanism, a steering mechanism, wheel track and ground clearance adjustment devices, damping devices, upright posts, a case, etc. The traveling mechanism includes four wheel-side motors 7, four speed reducers 8, and four wheels 1. The wheels 1 are respectively connected to the lower parts of the four upright posts of the platform through respective rigid independent suspensions 2. An upper part and a lower part of each upright post are connected together via a damping device 4. The lower ends of the wheel track and ground clearance adjustment devices 5 are connected to respective upper parts of the upright posts through revolute joints, and upper ends of the wheel track and ground clearance adjustment devices 5 are connected to the case 6. The case 6 is a cuboid shell and configured for receiving devices, such as a battery. An upper part of the case 6 is configured for carrying a monitoring device.

In the present disclosure, the wheel-side motors 7 and the speed reducers 8 are all located on inner sides of the respective wheels 1. Output shafts of the wheel-side motors are connected to respective speed reducers 8. Output shafts of the speed reducers 8 and the rotating shafts of the respective wheels 1 are coaxial. The wheels 1 rotate forward or reversely through the forward or reverse rotation of the wheel-side motors 7, so as to drive the platform to move forward or backward. The wheels are connected to the respective upright posts 3 through the respective rigid independent suspensions 2.

In the present disclosure, the upright posts 3 are of sleeve structures and each include an upper sleeve 31 and a lower sleeve 32. The upper sleeves 31 are connected to the respective wheel track and ground clearance adjustment devices 5 through revolute joints. Torque motors 9 are built in respective lower sleeves 32. The bases of the torque motors 9 are welded with the bottom ends of the respective lower sleeves 32. Output shafts of the torque motors 9 and the suspensions 2 are connected by using splines and are limited by using clamp springs. During steering, the torque motors 9 rotate to drive the upright posts 3, the suspensions 2, and the wheels 1 to rotate by the same angle, so as to realize a steering function of the platform.

In the present disclosure, two of the spring damping devices 4 are symmetrically connected between the upper part and the lower part of each sleeve, and are configured to alleviate the impact of field pavement vibration on the monitoring of the platform.

In the present disclosure, each wheel track and ground clearance adjustment device 5 is double-rocker arm structure and includes an upper rocker arm and a lower rocker arm. The upper rocker arm 51 is trapezoidal and has an upper end connected to the case 6 through a revolute joint and a lower end connected to the upper sleeve 31 of a corresponding upright post through a revolute joint. The lower rocker arm 52 is triangular and has an upper end connected to the case 6 through a revolute joint and a lower end connected to the upper sleeve 31 of the upright post through a revolute joint. The rotating axes of the upper rocker arm and the lower rocker arm are parallel to each other. Lifting lugs are welded at tops of triangles of the lower rocker arms 52 and side surfaces of the case 6. The electric hydraulic rods 10 are connected between the case 6 and respective lower rocker arms 52 through the lifting lugs. The extending and retracting of the hydraulic rods 9 can drive the double-rocker arm structures to rotate, so as to drive the upright posts 3, the suspensions 2, and the wheels 1 connected to the lower sleeve of the double-rocker arms to perform corresponding movement.

In the present disclosure, during striding, first, one electric hydraulic rod 10 is shortened, and the other three electric hydraulic rods are locked. The one hydraulic rod 10 drives a double-rocker arm 5 to rotate and get close to the case 6, and the double-rocker arm 5 lifts the upright post 3, the suspension 2, and the wheel 1 connected to the lower part of the double-rocker arm upwards. At this time, the wheel 1 leaves the ground, and then, the torque motor 9 rotates to rotate the wheel by 90 degrees, and the electric hydraulic rod 10 is extended and is returned to the original length, so that the wheel 1 is in contact with the ground. Finally, by the same method, the other three wheels 1 are lifted away from the ground in sequence by the respective hydraulic rods 10, and are placed on the ground after being adjusted to 90 degrees in the same direction. After the four wheels are rotated by 90 degrees, the wheels are driven to move forward by respective the wheel-side motors 7, so as to realize striding. After striding to a required position, the four hydraulic rods 10 are shortened in sequence, the double-rocker arms 5 drive the wheels 1 to leave the ground, then the torque motors 9 drive the wheels to rotate back to the original positions (rotate −90°), later, the hydraulic rods 9 extend, the wheels 1 land, and a striding action is completed. This striding mode avoids the problems of serious crop crushing and insufficient steering space due to too large steering radius when the platform turns around and strides in the field. In addition, the wheels rotate in the case of leaving away from the ground, which avoids the damage of the wheels to the crops, and avoids the deformation of partial compounds due to the fact that great friction is produced when the wheels directly turn on the pavement.

In the present disclosure, the four hydraulic rods 10 are shortened in sequence before the wheel track is adjusted. The wheels are lifted away from the ground by converging respective double-rocker arms 5, and the wheels are steered 90° by respective torque motors 9, and then the hydraulic rods 10 extend to the original length, so that the wheels 1 land. After the four wheels 1 all complete the abovementioned action, the hydraulic rods 10 are adjusted to extend and retract according to the required wheel track, so that the double-rocker arms 5 drive respective wheels 1 to roll to adjust the wheel track. After the wheel track is adjusted, the wheels 1 are lifted away from the ground, and are recovered to the original positions (rotated 90° reversely). The wheel track adjustment range is 1.2 m to 1.6 m, which can meet multi-row monitoring of common dry crops.

In the present disclosure, during adjusting the wheel track, the case 6 rotates relative to the double-rocker arms 5, so the ground clearance of the case 6, i.e., the ground clearance of the platform, changes along therewith. The position of the case 6 can be adjusted to two states, namely a first state in which the case is higher than the upright posts 3 and the overall platform is a convex-shaped structure, and an included angle between the double-rocker arm 5 and the upright post 3 is an obtuse angle; and a second state in which the case is lower than top ends of the upright posts 3 and the overall platform is M-shaped structure, and an included angle between the double-rocker arm 5 and the upright post 3 is an acute angle. Therefore, under the same wheel track, there are two states of the ground clearance for selecting, and the adjustment range of the ground clearance of the platform is 770 to 1333 mm. Thus, the field trafficability of the platform is ensured and crops are prevented from being damaged, and different monitoring height can also be met.

The above shows and describes basic principles and main features, and advantages of the present disclosure. Those of ordinary skill in the art should understand that the above-mentioned embodiments are not intended to limit the scope of protection of the present disclosure in any form. All technical solutions obtained by using equivalent replacement and the like fall within the scope of protection of the present disclosure.

The parts not involved in the present disclosure are the same as those in the prior art or can be realized by using the prior art.

What is claimed is:

1. A self-propelled platform for monitoring field crop phenotype, comprising:
   a traveling and steering mechanism;
   wheel track and ground clearance adjustment devices;
   damping devices;
   and a case;
   wherein the traveling and steering mechanism comprises:
      a plurality of wheel-side motors;
      a plurality of wheels; and
      a plurality of torque motors;
   wherein the plurality of wheels are driven to travel through respective ones of the plurality of wheel-side motors and are driven to steer through respective ones of the plurality of torque motors;
   wherein the plurality of wheels are respectively connected to respective upright posts of the self-propelled platform through respective suspensions being rigid independent;
   wherein each of the respective upright posts is of sleeve structures, and comprises an upper sleeve and a lower sleeve, between which a corresponding one of the damping devices is connected;
   wherein the wheel track and ground clearance adjustment devices are configured for adjusting a height of the case and tracks between the plurality of wheels; and
   wherein lower ends of the wheel track and ground clearance adjustment devices are rotatably connected to the respective upright posts, and upper ends of the wheel track and ground clearance adjustment devices are rotatably connected to the case.

2. The self-propelled platform according to claim 1, wherein output shafts of the plurality of wheel-side motors are connected to respective speed reducers; output shafts of the respective speed reducers are coaxial with rotating shafts of respective ones of the plurality of wheels; wherein the plurality of wheel-side motors rotate forward or reversely to drive respective ones of the plurality of wheels to rotate forward or reversely, so as to drive the self-propelled platform to move forward or backward.

3. The self-propelled platform according to claim 2, wherein
a number of the plurality of wheel-side motors, a number of the respective speed reducers, a number of the plurality of wheels and a number of the plurality of torque motors are four;
the plurality of wheel-side motors and the speed reducers are all located on inner sides of respective ones of the plurality of the wheels;
the plurality of wheel-side motors are located above the respective speed reducers; and
the plurality of wheel-side motors transfers power to the rotating shafts of the respective ones of the plurality of wheels through the respective speed reducers.

4. The self-propelled platform according to claim 1, wherein,
each of the respective upright posts comprises the upper sleeve and the lower sleeve; the upper sleeve is connected to the lower sleeve through a spring damping device for reducing an impact of pavement vibration on the self-propelled platform;
the upper sleeve is connected to a corresponding one of the wheel track and ground clearance adjustment devices through a corresponding one of first revolute joints;
a corresponding one of the plurality of torque motors is built in the lower sleeve;
a base of the corresponding one of the plurality of torque motors is fixedly connected to a bottom end of the lower sleeve;
an output shaft of the corresponding one of the plurality of torque motors and a corresponding one of the respective suspensions are connected by a spline and are limited by a clamp spring; and
the corresponding one of the plurality of torque motors rotates to drive a corresponding one of the plurality of wheels to rotate to realize steering.

5. The self-propelled platform according to claim 1, wherein each of the wheel track and ground clearance adjustment devices is of a double-rocker arm structure; the double-rocker arm structure comprises an upper rocker arm and a lower rocker arm; the upper rocker arm is of trapezoidal structure; and the lower rocker arm is of triangular structure.

6. The self-propelled platform according to claim 5, wherein two ends of each of the upper rocker arm and the lower rocker arm are respectively connected to the case and an upper part of a corresponding upright post through respective third revolute joints; and rotation axes of the upper rocker arm and the lower rocker arm are all parallel.

7. The self-propelled platform according to claim 5, wherein
lifting lugs are welded at a top of each said lower rocker arm and side surfaces of the case;
two ends of each electric hydraulic rod are respectively connected to a lifting lug of the lifting lugs at a top of a corresponding one of said lower rocker arm and another lifting lug of the lifting lugs at a corresponding side surface of the case through fourth revolute joints;
gaps at joints of the lifting lugs and the each electric hydraulic rod are filled with rubber gaskets;
and an adjustment of the wheel track and the ground clearance is realized through extending and retracting of the each electric hydraulic rod.

8. The self-propelled platform according to claim 1, wherein
the self-propelled platform strides in such a way that: one of four electric hydraulic rods is shortened, and other three electric hydraulic rods are locked; the shortened hydraulic rod drives a double-rocker arm structure to rotate and get closer to the case, so as to drive a corresponding one of the respective upright posts, a corresponding one of the respective suspensions, and a corresponding one of the plurality of wheels to move upwards;
the corresponding one of the plurality of wheels is lifted away from the ground, then, the torque motor rotates the corresponding one of the plurality of wheels by 90 degrees, and the shortened electric hydraulic rod extends to an original position, so that the corresponding one of the plurality of wheels is in contact with the ground;
finally, by a same method, other three wheels of the plurality of wheels are lifted away from the ground in sequence by respective electric hydraulic rods, and are placed on the ground after being adjusted by 90 degrees in a same direction;
after four wheels of the plurality of wheels all are rotated by 90 degrees, the four wheels are driven to move in a same direction through the plurality of wheel-side motors, so as to perform transverse striding movement; and
after the self-propelled platform strides to a required position, the electric hydraulic rods are shortened in sequence such that double-rocker arm structures drive the plurality of wheels to leave the ground, then the plurality of torque motors drive respective ones of the plurality of wheels to rotate back to original positions, and the electric hydraulic rods extend, and the plurality of wheels land, so that a striding action is completed.

9. The self-propelled platform according to claim 1, wherein a wheel track of the self-propelled platform is adjusted in such a way that: four electric hydraulic rods are shortened in sequence, such that the double-rocker arm structures are converged in sequence to lift respective ones of the plurality of wheels away from the ground, the respective ones of the plurality of wheels are steered by 90 degrees by respective ones of the plurality of torque motors, and then the electric hydraulic rods extend to original lengths, so that the respective ones of the plurality of wheels land;
after the wheels all complete abovementioned action, the electric hydraulic rods are adjusted to extend and retract according to a required wheel track, so that the double-rocker arm structures drive respective ones of the plurality of wheels on two sides of the case to roll in opposite directions to adjust the wheel track; and after the wheel track is adjusted, the wheels are lifted away from the ground, are recovered to original positions, and land.

10. The self-propelled platform according to claim 1, wherein
a battery is mounted inside the case;
an upper part of the case is configured for carrying a monitoring device; and
the case is configured to adjust to two positions, that is a first position where the case is higher than the upright posts and the self-propelled platform exhibits a convex-shaped structure, and a second position where the case is lower than top ends of the upright posts and the self-propelled platform exhibits an M-shaped structure.

11. The self-propelled platform according to claim 6, wherein lifting lugs are welded at a top of each said lower rocker arm and side surfaces of the case;

two ends of each electric hydraulic rod are respectively connected to a lifting lug of the lifting lugs at a top of a corresponding one of said lower rocker arm and another lifting lug of the lifting lugs at a corresponding side surface of the case through fourth revolute joints;

gaps at joints of the lifting lugs and the each electric hydraulic rod are filled with rubber gaskets;

and an adjustment of the wheel track and the ground clearance is realized through extending and retracting of the each electric hydraulic rod.

12. The self-propelled platform according to claim 8, wherein a battery is mounted inside the case;

an upper part of the case is configured for carrying a monitoring device; and the case is configured to adjust to two positions, that is a first position where the case is higher than the upright posts and the self-propelled platform exhibits a convex-shaped structure, and a second position where the case is lower than top ends of the upright posts and the self-propelled platform exhibits an M-shaped structure.

13. The self-propelled platform according to claim 9, wherein a battery is mounted inside the case;

an upper part of the case is configured for carrying a monitoring device; and the case is capable of being adjusted to two position, that is a first position where the case is higher than the upright posts and the self-propelled platform exhibits a convex-shaped structure, and a second position where the case is lower than top ends of the upright posts and the self-propelled platform exhibits an M-shaped structure.

* * * * *